United States Patent
Kobayashi et al.

(10) Patent No.: US 8,574,784 B2
(45) Date of Patent: Nov. 5, 2013

(54) SOLID OXIDE FUEL CELL INCLUDING ELECTRODE CONTAINING DENSE BONDING PORTIONS AND POROUS NON-BONDING PORTIONS

(75) Inventors: Ayano Kobayashi, Nagoya (JP); Makoto Ohmori, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 13/328,226

(22) Filed: Dec. 16, 2011

(65) Prior Publication Data
US 2012/0164552 A1  Jun. 28, 2012

(30) Foreign Application Priority Data

Dec. 20, 2010 (JP) ................... 2010-283453
Sep. 16, 2011 (JP) ................... 2011-202759

(51) Int. Cl.
H01M 4/02 (2006.01)
H01M 4/36 (2006.01)
H01M 4/64 (2006.01)
H01M 8/10 (2006.01)
H01M 8/22 (2006.01)

(52) U.S. Cl.
USPC ........... 429/482; 429/495; 429/505; 429/517; 429/533

(58) Field of Classification Search
USPC ................. 429/480, 482, 495, 505, 517, 533
See application file for complete search history.

(56) References Cited

U.S. PATENT DOCUMENTS

| | | | |
|---|---|---|---|
| 6,096,451 A * | 8/2000 | Shiratori et al. | 429/465 |
| 7,273,673 B2 | 9/2007 | Akikusa et al. | |
| 7,910,262 B2 | 3/2011 | Akikusa et al. | |
| 2004/0038808 A1* | 2/2004 | Hampden-Smith et al. | 502/180 |
| 2004/0058223 A1* | 3/2004 | Shibata et al. | 429/38 |
| 2007/0178366 A1 | 8/2007 | Mahoney et al. | |
| 2007/0248869 A1 | 10/2007 | Ohmori et al. | |
| 2008/0008826 A1* | 1/2008 | Coulon et al. | 427/115 |

(Continued)

FOREIGN PATENT DOCUMENTS

| EP | 1858106 A2 | 11/2007 |
|---|---|---|
| EP | 1919021 A2 | 5/2008 |

(Continued)

OTHER PUBLICATIONS

Japanese Office Action dated Nov. 22, 2011 (with English translation).

(Continued)

*Primary Examiner* — Sean P Cullen
(74) *Attorney, Agent, or Firm* — Burr & Brown

(57) ABSTRACT

A solid oxide fuel cell having a fuel electrode, a solid electrolyte film, an air electrode, and a conductive current-collecting mesh bonded to an upper surface, opposite to a lower bonding surface with the solid electrolyte film, of the air electrode. Plural bonding portions that are bonded to the current-collecting mesh and plural non-bonding portions that are not bonded to the current-collecting mesh are present on the upper surface of the air electrode. In the air electrode, regions having a porosity smaller than a porosity of the other region are respectively formed on the position in the middle of the thickness of the air electrode from each bonding portion. The average of the porosity of the dense portion is 20% or more and less than 35%, while the average of the porosity of the porous portion is 35% or more and less than 55%.

7 Claims, 2 Drawing Sheets

(56) References Cited

U.S. PATENT DOCUMENTS

| | | |
|---|---|---|
| 2008/0038619 A1* | 2/2008 | Takagi et al. .................. 429/34 |
| 2008/0096076 A1 | 4/2008 | Ohmori et al. |
| 2008/0254337 A1 | 10/2008 | Akikusa et al. |
| 2009/0136821 A1* | 5/2009 | Gottmann et al. ............. 429/33 |
| 2010/0151345 A1 | 6/2010 | Salvatore et al. |
| 2010/0167164 A1 | 7/2010 | Reilly et al. |

FOREIGN PATENT DOCUMENTS

| | | |
|---|---|---|
| JP | 06-096779 A1 | 4/1994 |
| JP | 2002-216807 A1 | 8/2002 |
| JP | 2005-339904 | 12/2005 |
| JP | 2008-010173 A1 | 1/2008 |
| JP | 2008-071594 A1 | 3/2008 |
| JP | 2008-135360 | 6/2008 |
| JP | 2009-522748 A1 | 6/2009 |
| JP | 2009-245897 A1 | 10/2009 |
| JP | 2009-259746 | 11/2009 |
| JP | 2009-277470 | 11/2009 |
| JP | 2010-80151 | 4/2010 |
| JP | 2011-17055 | 1/2011 |
| JP | 2011-165374 | 8/2011 |

OTHER PUBLICATIONS

Extended European Search Report dated Jul. 8, 2013.

* cited by examiner

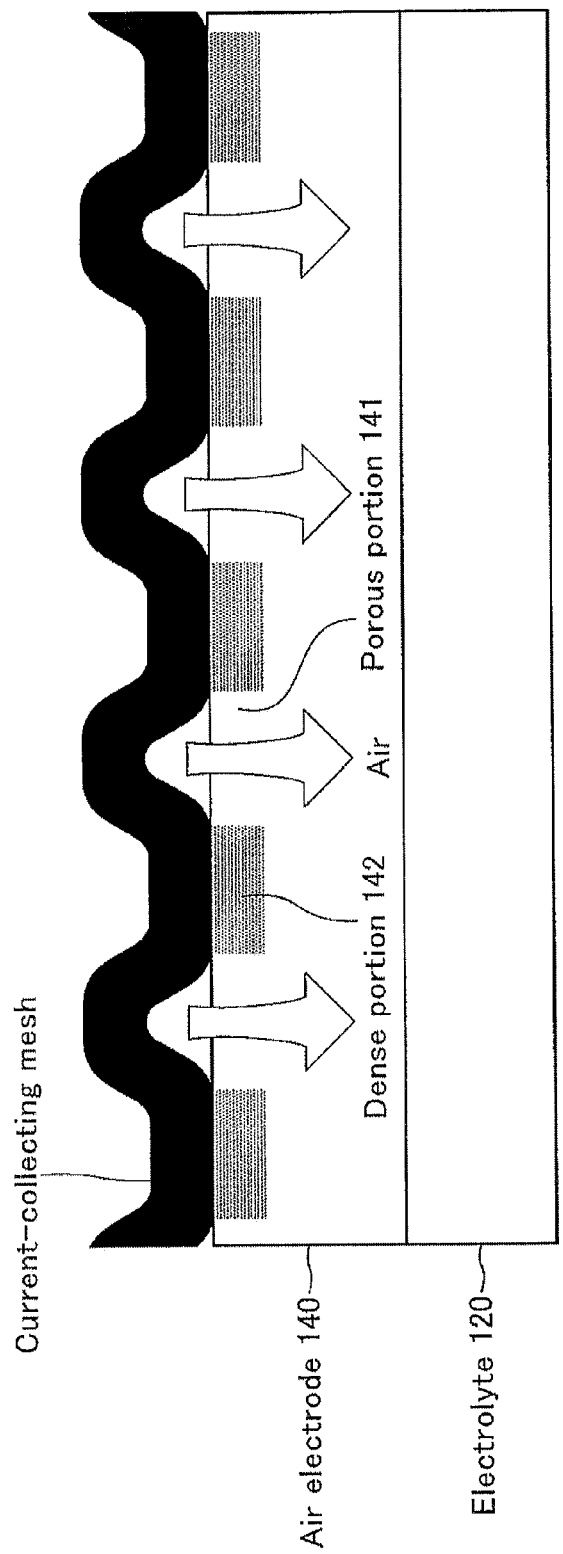

SOLID OXIDE FUEL CELL INCLUDING ELECTRODE CONTAINING DENSE BONDING PORTIONS AND POROUS NON-BONDING PORTIONS

BACKGROUND OF THE INVENTION

1. Field of the Invention

The present invention relates to a solid oxide fuel cell (SOFC).

2. Description of the Related Art

An SOFC includes a fuel electrode that is in contact with a fuel gas to react the fuel gas; a solid electrolyte film bonded to the fuel electrode; and an air electrode that reacts a gas containing oxygen, and that is bonded to the solid electrolyte film so as to sandwich the solid electrolyte film between the fuel electrode and the air electrode (see, for example, Japanese Unexamined Patent Application No. 2005-339904). A fuel gas (hydrogen gas, etc.) is supplied to the fuel electrode of the SOFC and a gas (air, etc.) containing oxygen is supplied to the air electrode of the SOFC, whereby a chemical reaction represented by Formulas (1) and (2) described below is generated. Thus, a potential difference is produced between the fuel electrode and the air electrode.

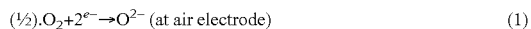

$$(1/2) \cdot O_2 + 2e^- \rightarrow O^{2-} \text{ (at air electrode)} \quad (1)$$

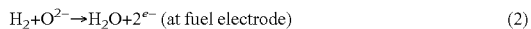

$$H_2 + O^{2-} \rightarrow H_2O + 2e^- \text{ (at fuel electrode)} \quad (2)$$

SUMMARY OF THE INVENTION

In general, the electrode of the SOFC is made of a porous material. In order to allow the gas externally supplied to the surface of the electrode to undergo the above-mentioned reaction, the gas is supplied to a reaction field in the electrode through many pores present in the electrode. From the viewpoint of enhancing diffusivity of the gas in the electrode, it is considered that the porosity of the material forming the electrode is preferably large.

In the SOFC, a conductive current-collecting member (e.g., current-collecting mesh) for taking power based upon a potential difference to the outside is electrically connected and bonded to both of or each of the fuel electrode and the air electrode. From the viewpoint of enhancing the bonding strength of the bonding portion between the electrode and the current-collecting member, it is preferable that the porosity of the material forming the electrode is small in order to increase the bonding area or in order to enhance the strength of the electrode.

From above, it is difficult to attain both the enhancement in the diffusivity of the gas in the electrode and the enhancement in the bonding strength of the bonding portion between the electrode and the current-collecting member, if the porosity in the electrode of the SOFC is uniform. It has been desired to attain the enhancement in the diffusivity of the gas in the electrode, i.e., a high output, and the enhancement in the bonding strength of the bonding portion between the electrode and the current-collecting member, i.e., high reliability.

The present invention is accomplished for solving the foregoing problem, and aims to provide an SOFC that can attain both the enhancement in the diffusivity of the gas in the electrode, and the enhancement in the bonding strength of the bonding portion between the electrode and the current-collecting member.

The SOFC according to the present invention includes "a fuel electrode that is in contact with a fuel gas to react the fuel gas"; "a solid electrolyte film bonded to the fuel electrode"; and "an air electrode that reacts a gas containing oxygen, and that is bonded to the solid electrolyte film in order that the solid electrolyte film is sandwiched between the fuel electrode and the air electrode". A conductive current-collecting member is bonded to one (or both) of the air electrode and the fuel electrode so as to be electrically connected thereto.

The feature of the SOFC according to the present invention is as follows. Specifically, the surface of the electrode excluding the bonding surface with the solid electrolyte film includes "one or plural bonding portions bonded to the current-collecting member", and "one or plural non-bonding portions not bonded to the current-collecting member". The electrode includes a first portion and a second portion. The first portion is a "portion that includes the one or plural bonding portions, and that extends continuously from the one or plural bonding portions". The second portion is a "portion that includes the one or plural non-bonding portions, and that is the remaining portion other than the first portion". The bonding surface of the electrode with the solid electrolyte film can be composed only of the second portion. The porosity of the first portion is smaller than the porosity of the second portion.

The porosity of the first (second) portion is a value related to porosities obtained for respective many micro parts, which are formed by dividing the first (second) portion into many parts, for example. The porosity of the first (second) portion is typically an average of the respective porosities. When the one electrode is the air electrode, the average (the average of the porosities for the respective micro parts that are obtained by dividing the first portion) of the porosity of the first portion can be set to be 20% or more and less than 35%, and the average (the average of the porosities for the respective micro parts that are obtained by dividing the second portion) of the porosity of the second portion can be set to be 35% or more and less than 55%.

With this structure, the porosity of the first portion on the electrode, i.e., the porosity of the "portion near the bonding portion with the current-collecting member" on the electrode, is less. As a result, the bonding strength of the bonding portion between the electrode and the current-collecting member is enhanced. On the other hand, the porosity of the second portion on the electrode, i.e., the porosity of the "remaining portion other than the first portion" on the electrode, is greater. Accordingly, when a gas externally supplied to the surface of the electrode is supplied to the "bonding portion between the electrode and the solid electrolyte film" through the pores in the electrode, it is easy to pass through the pores on the second portion having the large porosity. Consequently, the gas diffusivity in the electrode is enhanced. Thus, the enhancement in the gas diffusivity in the electrode and the enhancement in the bonding strength of the bonding portion between the electrode and the current-collecting member can simultaneously be attained.

In the SOFC according to the present invention, when the one electrode has a plate-like shape, it can be configured such that the solid electrolyte film is banded to a first major surface of the one electrode, and the "one or plural bonding portions" and the "one or plural non-bonding portions" are present on a second surface, reverse to the first major surface, of the one electrode. In this case, the first portion spreads to the position in the middle of the thickness of the one electrode from the one or plural bonding portions, the first major surface is composed only of the second portion, and the second major surface is composed of the first portion and the second portion. In this case, the porosity of the first portion can be distributed to be decreased toward the second major surface.

With this structure, the gas enters the one electrode from the non-bonding portion on the second major surface of the one electrode. The gas entering the one electrode mainly moves inside of the second portion toward the first major surface. During this movement, the gas goes over the position corresponding to the bottom part of the first portion in the thickness direction of the one electrode, and then, can go around a region present between the bottom part of the first portion and the first major surface. Accordingly, the range where the gas can reach is increased on the bonding surface between the one electrode and the solid electrolyte film, compared to the structure in which the first portion continuously extends from the one or plural bonding portions up to the first major surface. Consequently, the reaction resistance of the SOFC can be reduced, whereby the output of the SOFC can be increased.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 2 is a schematic diagram illustrating one example of a distribution of a porous portion and a dense portion of an air electrode in the SOFC according to the embodiment of the present invention.

DETAILED DESCRIPTION OF THE INVENTION (Structure)

Figure 1:
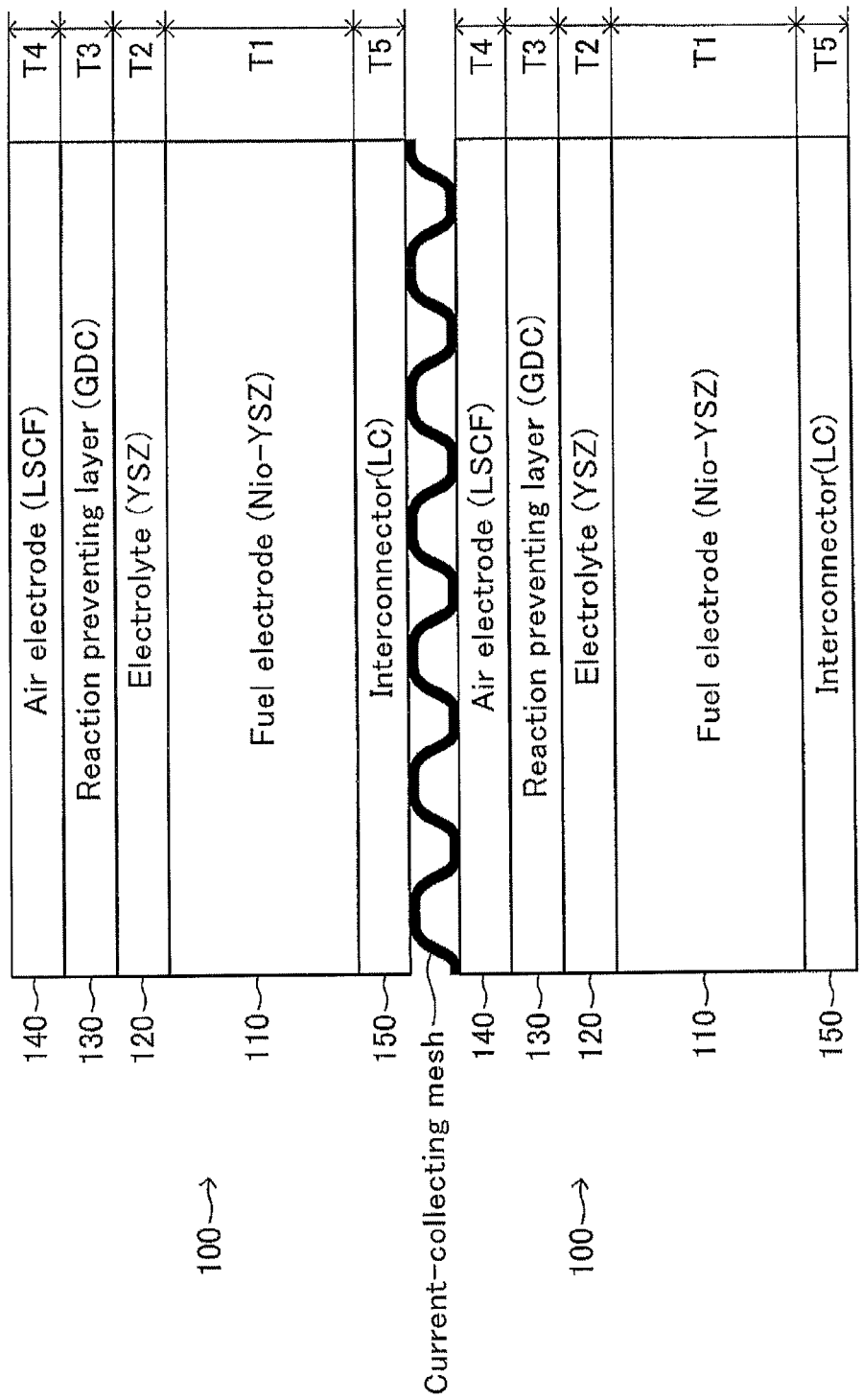
FIG. 1 is a schematic diagram illustrating a configuration of an SOFC according to an embodiment of the present invention.

FIG. 1 illustrates one example of an SOFC according to an embodiment of the present invention. In FIG. 1, two SOFC cells 100 and 100 are electrically connected in series through a current-collecting mesh. Each SOFC cell 100 will firstly be described below.

The SOFC cell 100 is a stacked body including a fuel electrode 110, a solid electrolyte film 120 stacked on the fuel electrode 110, a reaction preventing layer 130 stacked on the solid electrolyte film 120, an air electrode 140 stacked on the reaction preventing layer 130, and an interconnector 150 stacked below the fuel electrode 110. The shape of the cell 100 viewed from the top is, for example, a square having a side of 1 to 30 cm, a rectangle having a long side of 5 to 30 cm and a short side of 3 to 15 cm, or a circle having a diameter of 1 to 30 cm. The thickness of the cell 100 is 0.1 to 3 mm.

The fuel electrode 110 (anode electrode) is, for example, a sheet-type porous sintered body composed of nickel oxide NiO and yttria stabilized zirconia YSZ. The thickness T1 of the fuel electrode 110 is 0.1 to 3 mm. The thickness of the fuel electrode 110 is the greatest among the respective components of the cell 100, so that the fuel electrode 110 serves as a support substrate of the cell 100.

The electrolyte 120 is a sheet-type dense sintered body composed of YSZ. The thickness 12 of the electrolyte 120 is 3 to 30 μm.

The reaction preventing layer 130 is a sheet-type dense sintered body composed of celia. Specific examples of celia include GDC (gadolinium-doped celia), SDC (samarium-doped celia), etc. The thickness T3 of the reaction preventing layer 130 is 3 to 20 μm. The reaction preventing layer 130 is interposed between the electrolyte 120 and the air electrode 140 in order to prevent the occurrence of the phenomenon in which a reaction film having a great electric resistance is formed between the electrolyte 120 and the air electrode 140 through the reaction between the YSZ in the electrolyte 120 and the strontium in the air electrode 140 during the fabrication of the cell or in the cell 100, which is currently operated, of the SOFC.

The air electrode 140 (cathode electrode) is a sheet-type porous sintered body made of lanthanum strontium cobalt ferrite LSCF ((La, Sr)(Co, Fe)O$_3$). As the material for the air electrode 140, LSF (=(La, Sr)FeO$_3$ (lanthanum strontium ferrite), LNF (=(La(Ni, Fe)O$_3$) (lanthanum nickel ferrite), or LSC (=(La, Sr)CoO$_3$) (lanthanum strontium cobaltite), etc, may be used. The thickness T4 of the air electrode is 10 to 100 μm.

The interconnector 150 is a sheet-type dense sintered body composed of lanthanum chromite LC. A chemical formula of lanthanum chromite LC is represented by a formula (3) described below. In the formula (3), A is at least one type of element selected from Ca, Sr, and Ba. B is at least one type of element selected from Co, Ni, Mg, and Al. The range of x is 0 to 0.04, and more preferably, 0.05 to 0.2. The range of y is 0 to 0.3, and more preferably, 0.02 to 0.22. The range of z is 0 to 0.1, and more preferably, 0 to 0.05. δ is a very small value including 0. In the present embodiment, the upper side (inner side) of the interconnector (terminal electrode) 150 is exposed to a reduction atmosphere, while the lower side (outer side) thereof is exposed to an oxygen atmosphere. The LC is excellent under present circumstances as a conductive ceramic stable in both the reduction atmosphere and oxygen atmosphere. The thickness T5 of the interconnector 150 is 10 to 100 μm.

$$La_{1-x}A_xCr_{1-y-z}B_yO_{3-\delta} \quad (3)$$

As the material for the interconnector 150, titanium oxide represented by a chemical formula (4) is also preferable. In the chemical formula (4), A is at least one type of element selected from alkaline-earth elements. B is at least one type of element selected from Sc, Y, and lanthanoid element. D is at least one type of element selected from fourth-period, fifth-period, and sixth-period transition metals, Al, Si, Zn, Ga, Ge, Sn, Sb, Pb, and Bi. The range of x is 0 to 0.5, the range of y is 0 to 0.5, and the range of z is −0.05 to 0.05. δ is a very small value including 0. "Strontium titanate SrTiO$_3$" employing strontium Sr as A can be used as the titanium oxide, for example. The SrTiO$_3$ is also stable in both the oxygen atmosphere and reduction atmosphere.

$$(A_{1-x},B_x)_{1-z}(Ti_{1-y},D_y)O_{3-\delta} \quad (4)$$

The plural (two in FIG. 1) SOFC cells 100 described above are electrically connected in series through the current-collecting mesh. The current-collecting mesh is made of a ferrite SUS material. The current-collecting mesh is interposed between the air electrode 140 of one of the adjacent SOFC cells 100 and the interconnector 150 of the other SOFC cell 100, and bonded to the air electrode 140 and the interconnector 150 via a conductive bonding agent (not illustrated). The current-collecting mesh projects in the vertical direction on plural positions aligned longitudinally and laterally (arranged in a matrix), as viewed from top. Therefore, the air electrode 140 and the interconnector 150 are respectively bonded to the current-collecting mesh at the plural positions arranged in a matrix as viewed from top.

(Fabrication Process)

Next, one example of a method of fabricating the SOFC (stacked body of plural SOFC cells 100) illustrated in FIG. 1 will be described below. Firstly, one example of fabricating the cell 100 will be described.

A precursor (not sintered) of the fuel electrode 110 is formed as described below. Specifically, NiO powder, and YSZ powder are mixed, and polyvinyl alcohol (PVA) is added to the mixture as a binder, whereby slurry is prepared. This slurry is dried and granulated with a spray dryer to obtain powders for the fuel electrode. The powders are molded with a die press molding, whereby the precursor of the fuel electrode 110 is fabricated, A precursor (not sintered) of the electrolyte 120 is formed on the top surface of the precursor of the fuel electrode 110 as described below. Specifically, water and binder are added into YSZ powder, and the resultant mixture is mixed with a ball mill for 24 hours to prepare slurry. This slurry is applied on the top surface of the precursor of the fuel electrode 110, and dried, whereby the precursor (film) of the electrolyte 120 is formed. When the precursor (film) of the electrolyte 120 is formed on the top surface of the precursor of the fuel electrode 110, a tape stacking method, printing method, etc. may be used.

A precursor (not sintered) of the reaction preventing layer 130 is formed on the top surface of the precursor of the electrolyte 120 as described below. Specifically, water and binder are added into GDC powder, and the resultant mixture is mixed with a ball mill for 24 hours to prepare slurry. The slurry is applied on the top surface of the precursor of the electrolyte 120, and dried, whereby the precursor (film) of the reaction preventing layer 130 is formed. When the precursor (film) of the reaction preventing layer 130 is formed on the top surface of the precursor of the electrolyte 120, a tape stacking method, printing method, etc. may be used, Next, a precursor (not sintered) of the interconnector 150 is formed on the lower surface of the precursor of the fuel electrode 110 by using lanthanum chromite powders with a printing method, tape stacking method, slurry dipping method, plasma spraying method, or aerosol deposition method.

Thus, a stacked body (not sintered) including four layers, which are the precursor of the interconnector 150, the precursor of the fuel electrode 110, the precursor of the electrolyte 120, and the precursor of the reaction preventing layer 130, is formed. This stacked body (not sintered) is co-sintered at 1300 to 1600° C. for 2 hours, whereby a (sintered) stacked body including four layers, which are the dense interconnector 150, the porous fuel electrode 110, the dense electrolyte 120, and the dense reaction preventing layer 130, is formed.

Next, the air electrode 140 is formed on the top surface of the reaction preventing layer 130 of the stacked body as described below. Specifically, water and binder are added into LSCF powder, and the resultant mixture is mixed with a ball mill for 24 hours to prepare slurry, The slurry is applied on the top surface of the reaction preventing layer 130, dried, and then, sintered in an electric furnace (in an oxygen-containing atmosphere) at 1000° C. for 1 hour in air, whereby the porous air electrode 140 is formed on the top surface of the reaction preventing layer 130. The stacked body of the reaction preventing layer 130 and the air electrode 140 corresponds to the "air electrode" in the present invention. As described below, the distribution of porosity in the air electrode 140 can be adjusted by adjusting the powder characteristic (grain diameter, specific surface) of the LSCF powder or slurry characteristic (solid-liquid ratio, composition of an organic material such as the binder). One example of the method of fabricating the cell 100 has been described above.

The above-mentioned plural cells 100 are fabricated and prepared. The current-collecting mesh is interposed between the air electrode of one of the adjacent SOFC cells 100 and the interconnector 150 of the other SOFC cell 100. The bonding between the air electrode 140 and the current-collecting mesh, and the bonding between the interconnector 150 and the current-collecting mesh can be attained by using one of known conductive bonding agents. One example of the method of fabricating the SOFC illustrated in FIG. 1 has been described above.

(Distribution of Porosity in Air Electrode)

As illustrated in FIG. 2, the solid electrolyte film 120 is bonded to the lower surface (corresponding to a "first major surface") of the sheet-type air electrode 140. There are plural "bonding portions" bonded to the current-collecting mesh and plural "non-bonding portions" that are not bonded to the current-collecting mesh on the top surface (corresponds to a "second major surface") of the sheet-type air electrode 140. When the air electrode 140 is viewed from top, the plural "bonding portions" are arranged to be apart from one another with a predetermined space in a matrix, while the plural "non-bonding portions" are also arranged to be apart from one another with a predetermined space in a matrix.

The air electrode 140 includes a portion with a large porosity (see white regions in the figure. This portion is referred to as "porous portion 141" below), and a portion with a small porosity (see regions indicated by fine dots in the figure. This portion is referred to as "dense portion 142" below).

Plural dense portions 142 are present, each of which corresponds to each of the plural "bonding portions". Each of the dense portions 142 includes the corresponding "bonding portion", and continuously spreads from the corresponding "bonding portion" in the vicinity of the corresponding "bonding portion". Each dense portion 142 extends downward from the corresponding "bonding portion" (i.e., the top surface of the air electrode 140 to which the current-collecting mesh is bonded) to the position in the middle of the thickness of the air electrode 140. On the other hand, the porous portions 141 are the remaining portion of air electrode 140 other than the plural dense portions 142, and including the plural "non-bonding portions". The lower surface of the air electrode 140 is composed of only the porous portion 141, while the top surface of the air electrode 140 is composed of the plural dense portions 142 and the plural porous portions 141.

The average of the porosity of the porous portions 141 is 35% or more and less than 55%, while the average of the porosity of the dense portions 142 is 20% or more and less than 35%. In other words, it can be said that a boundary surface, which separates the porous portions 141 and the dense portions 142 such that the average of the porosity in the porous portions 141 becomes 35% or more and less than 55%, and the average of the porosity of the dense portions 142 becomes 20% or more and less than 35%, is present in the air electrode 140. Further, in the dense portions 142, the porosity is distributed to become smaller toward the top surface (corresponds to the second major surface) of the air electrode 140.

Here, the "average of the porosity in the porous portion 141 (or dense portion 142)" means the average of the porosity obtained for each micro part, which are obtained by dividing the porous portion 141 (or dense portion 142) into many micro parts. Specifically, the "boundary surface separating the porous portion 141 and the dense portion 142" can be determined as described below.

The cross-sections (planes) formed by cutting the air electrode 140 on many different positions in the thickness direction are divided into micro parts. A square whose one side has a length of 1 to 10 μm can be employed as the micro part. In this case, the length of one side can optionally be selected according to the thickness of the air electrode 140. The porosity of the micro section of each of the micro parts on each cross-section is calculated by one of known methods (e.g., image analysis). With reference to the distribution of the respective porosities obtained as described above, "one or plural portions" that continuously extend from the "bonding portion" in the vicinity of the "bonding portion", and in which the average of many porosities corresponding to the inside thereof is 20% or more and less than 35% and the average of many porosities corresponding to the outside thereof is 35% or more and less than 55%, is searched. The "one or plural portions" of the air electrode 140 having porosities of 20% or more and less than 35% become one or plural dense portions 142, while the portions other than the "one or plural portions" of the air electrode 140 become the porous portions 141. The surface forming the contour of the "one or plural portions" formed as described above becomes the boundary surface.

The distribution of the porosity in the air electrode 140 described above is intentionally (positively) formed by adjusting the powder characteristic (grain diameter, specific surface) of the material of the air electrode (LSCF), which is used for fabricating the slurry that is the precursor of the air electrode 140, or slurry characteristic (solid-liquid ratio, composition of an organic material such as the binder).

Specifically, when the slurry film that is the precursor of the air electrode 140 is formed on the top surface of the reaction preventing layer 130, for example, the solid-liquid ratio of the slurry (the ratio of the solid in the whole, i.e., the ratio of the material of the air electrode in the whole) on the portion corresponding to the dense portion 142 is set larger than the ratio of the slurry on the portion corresponding to the porous portion 141. The solid-liquid ratio of the slurry on the portion corresponding to the dense portion 142 is also increased toward the top surface of the air electrode 140. This is based upon the fact that, the larger the solid-liquid ratio of the slurry is, the smaller the porosity becomes because the particle density increases.

Alternatively, the specific area of the powder, which is the material of the air electrode, on the portion corresponding to the dense portion 142 is set larger than the specific area of the powder on the portion corresponding to the porous portion 141. The specific area of the powder, which is the material of the air electrode, on the portion corresponding to the dense portion 142 is also increased toward the top surface of the air electrode 140. This is based upon the fact that, the larger the specific area of the powder is, the smaller the porosity becomes because the sintering performance increases.

The average diameter of the particle forming the dense portion 142 is larger than the average diameter of the particle forming the porous portion 141. Specifically, the diameter of the particle forming the dense portion 142 is 0.3 to 5 μm, wherein the average particle diameter is 1.2 to 2.5 μm. On the other hand, the diameter of the particle forming the porous portion 141 is 0.1 to 2.5 μm, wherein the average particle diameter is 0.3 to 1.2 μm. The ratio of the total area (the grass area) of the plural "bonding portions" present on the top surface of the air electrode 140 to the total area of the top surface (the second major surface) of the sheet-type air electrode 140 is 20 to 70%.

(Operation and Effect)

In the SOFC according to the embodiment of the present invention, the porosity in the air electrode 140 is distributed as described above. Therefore, the porosity of the dense portion 142 in the air electrode 140, i.e., the porosity of the "portion near the bonding portion with the current-collecting mesh" on the air electrode 140, is small. As a result, the bonding strength of the bonding portion between the air electrode 140 and the current-collecting mesh can be enhanced. On the other hand, the porosity of the porous portion 141 in the air electrode 140, i.e., the porosity of the "remaining portion other than the dense portion 142" on the air electrode 140, is large. Therefore, when the gas (e.g., air) externally supplied to the surface of the air electrode 140 is supplied to the "bonding portion between the air electrode 140 and the solid electrolyte film 120" through the pores in the air electrode 140, it is easy to pass through the pores of the porous portion 141 having a large porosity (see white arrows in FIG. 2). As a result, the gas diffusivity in the air electrode 140 is enhanced. From the above, the enhancement in the gas diffusivity in the air electrode 140 and the enhancement in the boding strength of the bonding portion between the air electrode 140 and the current-collecting mesh can simultaneously be attained.

Each dense portion 142 extends downward from the corresponding "bonding portion" (specifically, the top surface of the air electrode 140 to which the current-collecting mesh is bonded) to the position in the middle of the thickness of the air electrode 140. Therefore, the gas (e.g., air, see white arrows in FIG. 2) advancing mainly in the porous portion 141 of the air electrode 140 goes over the position corresponding to the bottom part of the dense portion 142 in the thickness direction of the air electrode 140, and then, it can go around a region present between the bottom part of the dense portion 142 and the lower surface (first major surface) of the air electrode 140. Accordingly, the range where the gas can reach is increased on the bonding surface between the air electrode 140 and the electrolyte 120, compared to the structure in which the dense portion 142 continuously extends from the plural "bonding portions" on the top surface of the air electrode 140 up to the lower surface (first major surface) of the air electrode 140. Consequently, the reaction resistance of the SOFC can be reduced, whereby the output of the SOFC can be increased.

The present invention is not limited to the above-mentioned embodiment, and various modifications are possible without departing from the scope of the present invention. For example, in the present embodiment, the "bonding portion" is present on plural portions as being dispersed, and the "non-bonding portion" is present on the remaining portion (e.g., as being dispersed in plural portions), as viewed from the top surface of the air electrode 140, because of the shape of the current-collecting mesh. However, as viewed from the top surface of the air electrode 140, the "bonding portion" may be concentrated on one portion, and the "non-bonding portion" may be present on the remaining region (i.e., the "non-bonding portion" may be continuously present without being dispersed on plural portions).

Although the air electrode 140 has a sheet-type shape in the above-mentioned embodiment, the air electrode 140 may have a shape other than the sheet-type shape.

In the above-mentioned embodiment, the air electrode is composed of the "dense portion (having a small porosity) including the "bonding portion" bonded to the current-collecting mesh", and the "porous portion (having a large porosity) including the "non-bonding portion" that is not bonded to the current-collecting mesh". However, the fuel electrode may be composed of the "dense portion (having a small porosity) including the "bonding portion" bonded to the current-collecting mesh", and the "porous portion (having a large porosity) including the "non-bonding portion" that is not bonded to the current-collecting mesh". In this case, the bonding strength of the bonding portion between the fuel electrode and the current-collecting mesh can be enhanced, and the diffusivity of the gas (e.g., hydrogen gas) flowing through the fuel electrode can be enhanced.

The present invention is naturally applicable not only to a "structure in which plural power-generating units, each of which is a stacked body including a fuel electrode, a solid electrolyte film, and an air electrode, are stacked in the stacking direction" (so-called "vertical-stripe cell stack"), but also to a "structure in which the power-generating units are arranged on different positions on a surface of a plate-like support member" (so-called "horizontal-stripe cell stack").

What is claimed is:

1. A solid oxide fuel cell comprising:
a fuel electrode that is in contact with a fuel gas to react the fuel gas;
a solid electrolyte film bonded to the fuel electrode;
an air electrode that reacts a gas containing oxygen, and that is bonded to the solid electrolyte film in order that the solid electrolyte film is sandwiched between the fuel electrode and the air electrode; and
a conductive current-collecting member that is bonded to one of the air electrode and the fuel electrode so as to be electrically connected thereto, wherein
a surface of the one electrode excluding a bonding surface with the solid electrolyte film includes one or plural bonding portions bonded to the current-collecting member, and one or plural non-bonding portions not bonded to the current-collecting member, and
the one electrode includes a first portion that includes the one or plural bonding portions, and that extends continuously from the one or plural bonding portions, and a second portion that is a remaining portion other than the first portion and includes the one or plural non-bonding portions, wherein
a porosity of the first portion is smaller than a porosity of the second portion, and the one electrode is a sintered body of a ceramic, and
wherein the one electrode has a plate-like shape;
the solid electrolyte film is bonded to a first major surface of the one electrode, the first major surface being the bonding surface with the solid electrolyte film;
the one or plural bonding portions and the one or plural non-bonding portions are present on a second major surface, that is opposite to the first major surface, of the one electrode, the second major surface being the surface of the one electrode excluding the bonding surface with the solid electrolyte film;
the first portion extends from the one or plural bonding portions to a position in the middle of the thickness of the one electrode; and
the first major surface is composed of only the second portion, while the second major surface is composed of the first portion and the second portion.

2. A solid oxide fuel cell according to claim 1, wherein an average diameter of particles forming the first portion is larger than an average diameter of particles forming the second portion.

3. A solid oxide fuel cell according to claim 1, wherein the one electrode is the air electrode, and
an average of the porosity of the first portion is 20% or more and less than 35%, while an average of the porosity of the second portion is 35% or more and less than 55%.

4. A solid oxide fuel cell according to claim 3, wherein the porosity of the first portion is distributed so as to decrease toward the second major surface.

5. A solid oxide fuel cell according to claim 4, wherein a ratio of total area of the one or plural bonding portions present on the second major surface to the total area of the second major surface is 20 to 70%.

6. A solid oxide fuel cell according to claim 3, wherein a ratio of total area of the one or plural bonding portions present on the second major surface to the total area of the second major surface is 20 to 70%.

7. A solid oxide fuel cell according to claim 1, wherein a ratio of total area of the one or plural bonding portions present on the second major surface to the total area of the second major surface is 20 to 70%.

* * * * *